No. 704,245. Patented July 8, 1902.
P. W. DUNNE.
MEANS FOR TRANSMITTING ROTARY MOTION.
(Application filed Jan. 30, 1901.)
(No Model.)
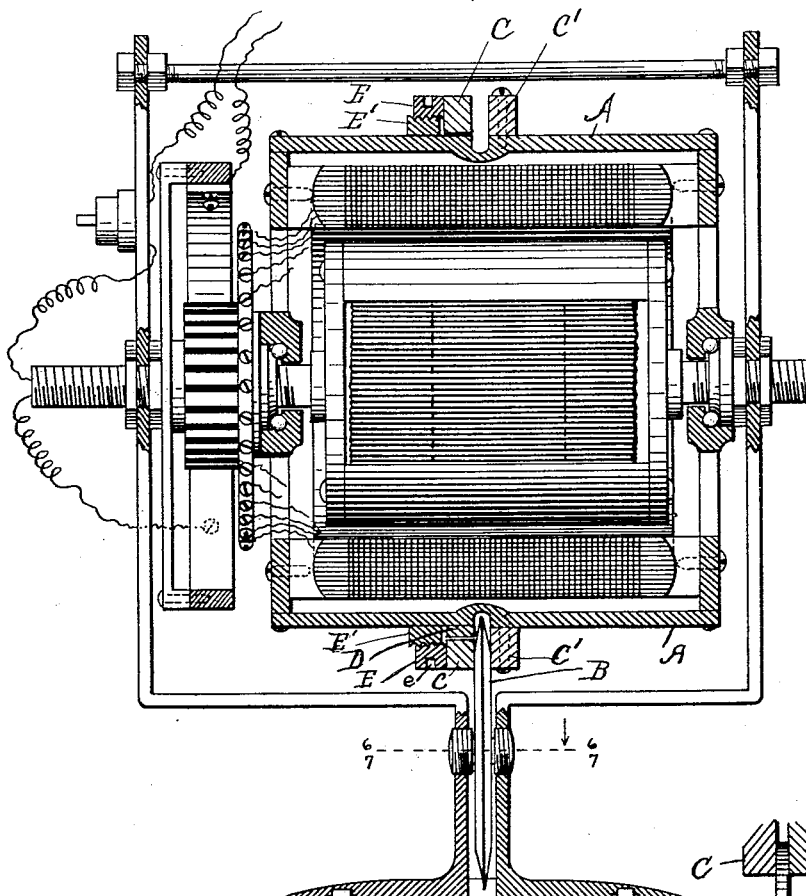
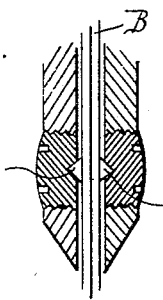
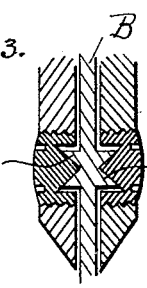
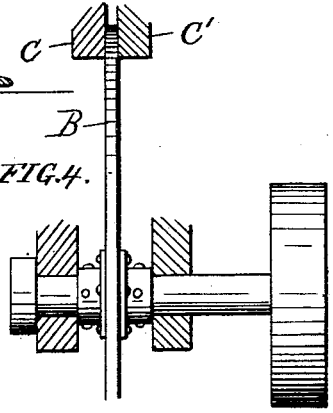
WITNESSES: F. B. Townsend
INVENTOR. Patrick W. Dunne
BY Munday Evarts & Adcock
ATTORNEYS.

UNITED STATES PATENT OFFICE.

PATRICK W. DUNNE, OF RIVER FORREST, ILLINOIS.

MEANS FOR TRANSMITTING ROTARY MOTION.

SPECIFICATION forming part of Letters Patent No. 704,245, dated July 8, 1902.

Application filed January 30, 1901. Serial No. 45,296. (No model.)

*To all whom it may concern:*

Be it known that I, PATRICK WILLIAM DUNNE, a citizen of the United States, residing in River Forrest, in the county of Cook and State of Illinois, have invented a new and useful Improvement in Means for Transmitting Rotary Motion, of which the following is a specification.

This invention relates to an improvement in means for communicating rotary motion from one rotating part to another by friction, being especially well adapted, for example, for imparting rapid rotation to the circular knife of a cloth-cutting machine from a revolving electric motor; and the invention consists primarily in the peculiar form of frictional gearing wherein the rotary driven part receives its power from the rotary driver by a lateral parallel contact therewith at a point near the periphery instead of the usual peripheral contact.

In the drawings, Figure 1 is a central vertical section of a rotary cloth-cutter provided with my invention. Figs. 2 and 3 are sectional views of modified forms of bearing for the driven disk or rotary knife. Fig. 4 is a view suggesting a general application of the peculiar gearing.

In said drawings, A represents the rotating cylindrical shell of the electric motor and constitutes the driver.

B is the rotary disk or knife-blade and is the driven part.

C is a movable ring mounted on the cylinder A and connected thereto, so as to rotate therewith, by means of lugs D, placed at intervals on the cylinder, so as to cause said ring C to rotate with the cylinder and at the same time be movable to and from the disk or knife B.

E is a screw-threaded ring provided with spanner-holes e at intervals, by means of which it can be turned upon the screw-threaded ring or projection E', which is secured rigidly to the surface of the cylinder A. By turning the screw-ring E the friction-ring C will be brought to bear with more or less force against the side of the disk or knife B to produce a driving friction therewith. Upon the opposite side of the knife or disk B and on the cylinder A is located the rigidly-fixed ring C', and it is between these two friction-producing rings C and C' that the driven wheel or disk B is clamped with an adjustable pressure by the laterally-applied friction and at a point near the periphery of said disk B. In practice I turn up the screw E until just enough pressure is brought upon the knife-disk to drive it against whatever work it has to do without slipping, and as the disk wears or conditions change I loosen or tighten this screw as occasion requires.

It will be seen that the construction of the rings C C' and the disk B is such that the frictional contact between said rings and said disk is a contact of parallel surfaces or sides which lie in the plane of motion of the driving and driven parts and also such that the pressure applied by the rings to the disk is a pressure applied immediately adjacent to the surfaces thus in parallel contact, so that there is no wedging action upon the rings C C', which might tend to tilt them out of plane or require the addition of a support between the rings at a point in their circumference opposite to said disks.

By this means of driving one rotary body from another high speeds can be easily attained and without any material loss of power by friction, there being less loss by friction than in many other forms of gearing. Moreover, the connection between the driving and driven parts is singularly complete and perfect and without lost motion or backlash, so that this form of gearing is exceedingly well adapted, owing to its simplicity, durability, and certainty, to use in very many forms of mechanism, and although I have shown the gearing as used in a cloth-cutter, to which it is excellently adapted, I do not wish to be understood as limiting myself to such use, as its quality and characteristics make it equally adapted to many other uses.

In the instance illustrated the disk B is provided with ball-bearings, as shown at Fig. 2; but any other form of bearing—such, for example, as that shown at Figs. 6, 7, and 8—may be employed.

At Fig. 8 the disk B instead of being a knife-blade is a plain circular flat disk mounted on an ordinary shaft, on which is shown a band-wheel from which power may be taken, if desired. This figure is intended to suggest or illustrate the varied uses to which my new frictional gearing may be applied.

In practice I make the disk B of steel, though it may be made of other material, and I prefer to make the bearing-surfaces of the frictional rings C C' of indurated wood fiber or some similar material.

The improved gearing above described is simple to make, economical of power, very durable, and comparatively noiseless in running, and, moreover, is entirely free from backlash.

The features herein shown specifically relating to the improvement in cloth-cutting devices as distinguished from the mechanical movement itself are reserved to form the subject-matter of another application, as I am informed by the Patent Office that they cannot be united herewith in one application.

I claim—

1. The means for communicating rotary motion from one shaft or rotating part to another, which consists in the combination of two shafts or rotating parts, a disk having flat parallel sides in its plane of rotation mounted on one of the shafts, two parallel rings or parts each having a flat parallel side in the plane of their rotation between which the disk is clamped with a frictional contact, and means for adjustably applying the clamping force adjacent to the place of frictional contact, substantially as specified.

2. The means for communicating rotary motion from one shaft or rotating part to another, which consists in the combination of two shafts or rotating parts, a disk having flat parallel sides in its plane of rotation mounted on one of the shafts, two parallel rings or parts each having a flat parallel side in the plane of their rotation between which the disk is clamped with a frictional contact, and means for adjustably applying the clamping force adjacent to the place of frictional contact, said means consisting of a screw-ring bearing against one of the clamping-rings immediately opposite to the frictional surfaces in contact, substantially as specified.

PATRICK W. DUNNE.

Witnesses:
H. M. MUNDAY,
EDW. S. EVARTS.